United States Patent [19]
Yu

[11] Patent Number: 5,828,426
[45] Date of Patent: Oct. 27, 1998

[54] APPARATUS FOR DECODING VARIABLE LENGTH CODED DATA OF BOTH MPEG-1 AND MPEG-2 STANDARDS

[75] Inventor: Pil-ho Yu, Suwon, Rep. of Korea

[73] Assignee: Samsung Electronics Co., Ltd., Kyungki-Do, Rep. of Korea

[21] Appl. No.: 699,938

[22] Filed: Aug. 20, 1996

[51] Int. Cl.⁶ .................................................. H04N 7/01
[52] U.S. Cl. ...................... 348/845.3; 348/441; 348/426
[58] Field of Search .................................. 348/384, 390, 348/845.3, 409, 419, 426, 423, 449, 467, 465, 441–459, 469–496; 341/63, 67; H04N 7/01

[56] References Cited

U.S. PATENT DOCUMENTS

| | | | |
|---|---|---|---|
| 5,381,144 | 1/1995 | Wilson et al. | 341/67 |
| 5,502,493 | 3/1996 | Meyer | 348/426 |
| 5,515,437 | 5/1996 | Katta et al. | 348/403 |

OTHER PUBLICATIONS

MPEG–2/CCIR 601 video decoder (ST13500A), SGS–Thomson Microelectronics, pp. 1 to 84, Jul. 1994.

*Primary Examiner*—Brian Casler
*Assistant Examiner*—Luanne P. Din
*Attorney, Agent, or Firm*—Sughrue, Mion, Zinn, Macpeak & Seas, PLLC

[57] ABSTRACT

A decoding apparatus for use in decoding data encoded according to MPEG-1 and MPEG-2 standards. The decoding apparatus generates a signal indicating that received data is encoded according to the MPEG-2 standard if an expansion start code is contained in the input data, while a code standard signal indicating the MPEG-1 code standard is generated if no expansion start code is contained in the input data. A run level determiner outputs data from one portion of the input data as an escape code level, when the code standard signal indicates the MPEG-2 code standard, and determines the escape code level according to whether an absolute value of data within a specific bit interval contained in the portion of data is larger than or equal to, or less than, 128, when the code standard signal indicates the MPEG-1 code standard.

4 Claims, 4 Drawing Sheets

FIG. 2A

| ESCAPE LEVEL | LEVEL VALUE |
|---|---|
| FORBIDDEN | −256 |
| 1000 0000 0000 0001 | −255 |
| 1000 0000 0000 0010 | −254 |
| . . . | . . . |
| 1000 0000 0111 1111 | −129 |
| 1000 0000 1000 0000 | −128 |
| 1000 0001 | −127 |
| 1000 0010 | −126 |
| . . . | . . . |
| 1111 1110 | −2 |
| 1111 1111 | −1 |
| FORBIDDEN | 0 |
| 0000 0001 | 1 |
| . . . | . . . |
| 0111 1111 | 127 |
| 0000 0000 1000 0000 | 128 |
| 0000 0000 1000 0001 | 129 |
| . . . | . . . |
| 0000 0000 1111 1111 | 255 |

FIG. 2B

| ESCAPE LEVEL | LEVEL VALUE |
|---|---|
| 1000 0000 0000 0001 | −2047 |
| 1000 0000 0000 0010 | −2046 |
| . . . | . . . |
| 1111 1111 1111 1111 | −1 |
| 0000 0000 0000 0000 | FORBIDDEN |
| 0000 0000 0000 0001 | +1 |
| . . . | . . . |
| 0111 1111 1111 1111 | +2047 |

# APPARATUS FOR DECODING VARIABLE LENGTH CODED DATA OF BOTH MPEG-1 AND MPEG-2 STANDARDS

BACKGROUND OF THE INVENTION

The present invention relates to a variable length decoding apparatus for different standards, and more particularly, to a variable length decoding apparatus for decoding escape codes of the Moving Picture Experts Group-I (MPEG-1) and MPEG-2 standards each having a different length of an escape level.

The MPEG, which is an international standard with respect to motion image data coding, has proposed an image compression technology including discrete cosine transform (DCT), quantization, variable length coding and motion prediction coding. The MPEG standard is classified into the MPEG-1 for CD-ROM application and the MPEG-2 for television broadcasting application. Particularly, since the MPEG-2 extends the MPEG-1 to present various motion compensation coding techniques, the code standard of the former is more complex than that of the latter. However, the MPEG-2 lacks a part of the code standard of the MPEG-1, and instead has a different part. Thus, the code standard of the MPEG-2 does not completely include that of the code standard. The code standard of the MPEG-2 differs from that of the MPEG-1 in variable length coded data.

The variable length coding in the MPEG standard is performed for each block of an 8×8 size having transform coefficients of a frequency domain obtained via DCT and quantization. The variable length coding scans transform coefficients of a two-dimensional region according to a scanning method of a predetermined pattern such as a zigzag scan and generates a [run, level] code comprising a pair of "run" and "level." Here, the "run" represents the number of successive transform coefficients each value of which is zero, and the "level" represents an absolute value of the transform coefficient whose value is not zero. Therefore, an 8×8 block may have a value of the run within the range of "0" to "63." The range of the level varies according to a degree of the quantization. However, when a value of the quantized transform coefficient is expressed an integer from "−2047" to "2047," the absolute value of the level has a range from "1" to "2047." Also, a separate sign bit is used to express a sign of "+" or "−" of the level.

When the "run" and "level" pair is expressed by a single sign, if the run is large or the level is large, the frequency of occurrence of the code is statistically very low. Thus, the codes are classified into a regular region having a high frequency of occurrence of a code and an escape region contrary thereto. The codes in the regular region having a relatively high frequency of occurrence are coded using the Huffman codes. The Huffman codes assign a shorter codeword in case of a code having a higher frequency of occurrence, and assign a longer codeword to a code having a lower frequency of occurrence. A fixed length code (FLC) is assigned to a code of an escape region having a lower frequency of occurrence. The FLC of the escape region is expressed in escape code form composed of an escape identification (ID) code and the FLC which can be discriminated from a codeword of the regular region. The FLC includes an escape run and an escape level. The escape level of the MPEG-2 is expressed as 12 bits, and that of the MPEG-2 is expressed 8 bits or 16 bits. Thus, to compatibly restore the escape codes of the MPEG-1 and the MPEG-2, a decoding process becomes complicated.

SUMMARY OF THE INVENTION

Therefore, to solve the above problem, it is an object of the present invention to provide an apparatus for decoding escape levels of both the MPEG-1 and MPEG-2 code standards.

To accomplish the above object of the present invention, there is provided an apparatus for decoding a variable length coded (VLC) and fixed length coded (FLC) data for use in MPEG-1 and MPEG-2 standards, the decoding apparatus comprising:

means for generating a code standard signal indicating whether input data is MPEG-1 code standard or MPEG-2 code standard; and means for determining a [run, level] code relating to a predetermined number of bits of the input data supplied from the means according to the code standard signal.

BRIEF DESCRIPTION OF THE DRAWINGS

The preferred embodiments are described with reference to the drawings wherein:

FIGS. 2A and 2B show tables for explaining escape levels according to MPEG-1 and MPEG-2 standards, respectively.

DETAILED DESCRIPTION OF THE PREFERRED EMBODIMENT

A preferred embodiment of the present invention will be described below in more detail with reference to the accompanying drawings FIGS. 1 through 4.

Figure 1:
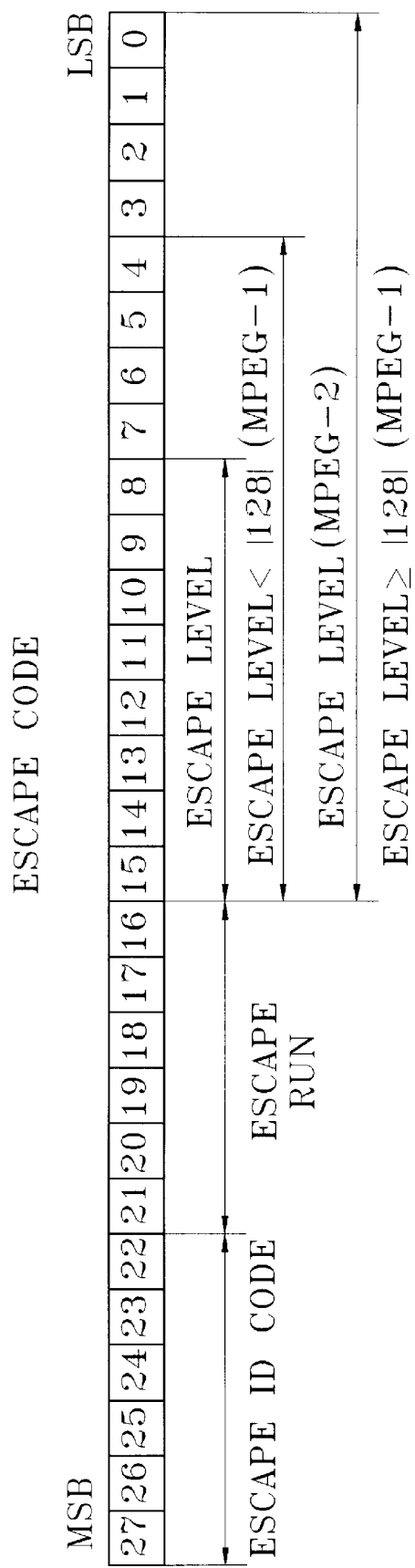
FIG. 1 shows a structure of an escape code.

FIG. 1 is a conceptual diagram for explaining a difference between escape codes of MPEG-1 and MPEG-2 standards. The escape code according to the MPEG-2 code standard is composed of 6-bit escape identification (ID) code and 18-bit fixed length code (FLC). The escape code according to the MPEG-1 code standard is composed of 14-bit or 22-bit FLC in addition to 6-bit escape ID code. The 14-bit FLC is used when an absolute value of the escape level is smaller than 128, while the 22-bit FLC is used when the former is equal to or larger than the latter. Therefore, the escape run and the escape level of the MPEG-1 and MPEG-2 standards are 28 bits at maximum from the most significant bit (MSB) to the least significant bit (LSB), and can be represented using the escape codes expressed in FIG. 1. The escape ID code has a fixed length of 6 bits from the MSB and represents whether or not it is an escape code. The escape ID code according to one embodiment of the present invention has data of "000001." An escape run is positioned in the upper 6-bit data of the FLC code. The above-described escape level is positioned in the following data of the FLC code in connection with the MPEG-1 or MPEG-2 standard.

FIGS. 2A and 2B show tables for explaining escape levels according to MPEG-1 and MPEG-2 standards, respectively. The escape level shown in FIG. 2A is expressed as a fixed length code according to the MPEG-1 standard. If an absolute value of the escape level is less than 128, the escape level is composed of eight bits including a sign bit, while if an absolute value of the escape level is equal to or larger than 128, the escape level is composed of sixteen bits including a sign bit. The escape level of the MPEG-2 standard shown in FIG. 2B is expressed as a fixed length code of twelve bits. The apparatus according to the preferred embodiment of the present invention which uses the escape codes depicted by FIGS. 1 through 2B, will be described below with reference to FIG. 3.

Figure 3:
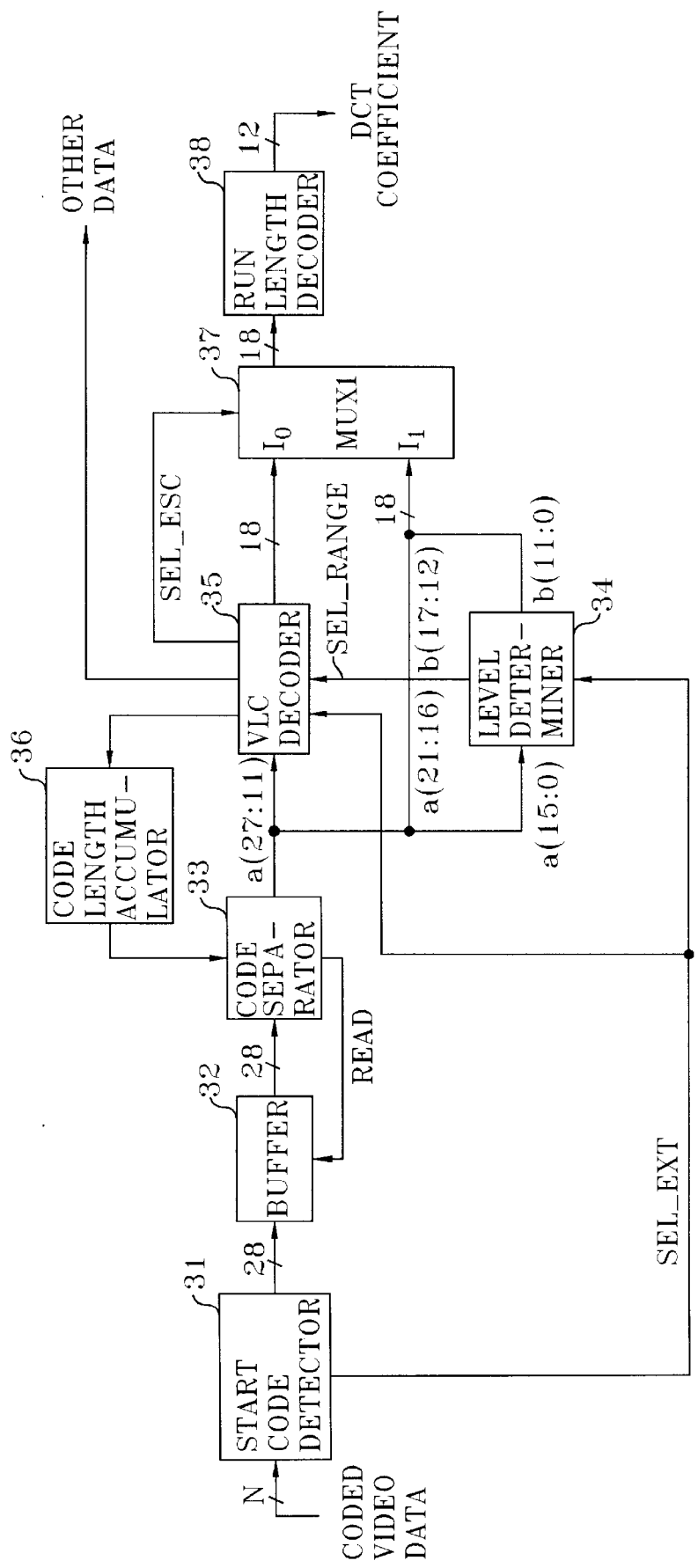
FIG. 3 is a block diagram showing a variable length decoding apparatus according to a preferred embodiment of the present invention.

In FIG. 3, a start code detector 31 receives a coded video bitstream in units of n bits and detects a start code representing a start portion of an interval. Then, the start code detector 31 generates a code standard signal depending upon the detection result of an expansion start code according to the MPEG-2 code standard. Here, the "n" is generally determined based on the number of the bits of the start code. The output of the start code detector 31 is connected to a buffer 32 for storing the video bitstream which is received m-bit by m-bit and outputting the m-bit video bitstream 28-bit by 28-bit whenever a read signal (READ) is input thereto. Here, the "m" is a maximum length which can be possessed by an escape code. In this embodiment, the "m" is of twenty-eight bits. A code separator 33 generates the read signal for reading 28-bit data from the buffer 32. The code separator 33 outputs the upper 17-bit data a[27:11] among the 28-bit data to a code table 35, and outputs the upper 6-bit data a[21:16] except for an escape ID code to a first multiplexer 37. The code separator 33 also outputs the lower 16-bit data a[15:0] among the 28-bit data to a level determiner 34. The level determiner 34 receives data a[15:0] and outputs a 12-bit escape level b[11:0] according to the MPEG-2 code standard and a range select signal SEL_RANGE. The code table 35 which receives a code standard signal SEL_EXT, a range select signal SEL_RANGE and data a[27:11] stores a code table according to the MPEG-1 and MPEG-2 code standards, and outputs a signal representing whether to detect a value of length of the decoded code, a VLC code and the escape ID signal. Here, the VLC code means a variable length coded code. A code length accumulator 36 accumulates a value of length of the decoded code and supplies the accumulated code length value to the code separator 33. The first multiplexer 37 includes an input end $I_0$ via which the VLC code is input from the code table 35 and an input end $I_1$ via which 18-bit data b[17:0] composed of the output data a[21:16] of the code separator 33 and the output data b[11:0] of the level determiner 34, is in put and selects one of the input ends $I_0$ and $I_1$ according to the signal SEL_ESC of the code table 35. The data output from the first multiplexer 37 is supplied to a run length decoder 38.

The FIG. 3 apparatus as constructed above will be described below in more detail.

The start code detector 31 detects a start code representing a start portion of an interval from a coded video data received in units of n bits and, if the expansion start code is detected according to the MPEG-2 code standard, the start code detector 31 judges that the received coded video data is data of the MPEG-2 code standard. The start code detector 31 generates the code standard signal SEL_EXT having a value of "1" if the expansion start code is detected, and generates the code standard signal SEL_EXT having a value of "0" if the expansion start code is not detected. The code standard signal SEL_EXT is supplied to the code table 35 and the level determiner 34. The start code detector 31 also outputs the coded data used for detection of the start code 28-bit by 28-bit to the buffer 32. The buffer 32 composed of a first-in-first-out (FIFO) memory supplies the 28-bit data to the code separator 33 whenever the read signal is applied from the code separator 33 thereto. The code separator 33 divides the 28-bit data applied from the buffer 32 into coded data a[27:11], coded data a[21:16] and coded data a[15:0]. Here, the number of bits of the coded data a[27:11] is identical to the maximum number of bits which can be possessed by the VLC codes of the MPEG-1 and MPEG-2 standard, the number of bits of the coded data a[21:16] is identical to the maximum number of bits which can be possessed by the escape run in the escape code, and the number of bits of the coded data a[15:0] is identical to the maximum number of bits which can be possessed by the escape level in the escape code. Therefore, when the 28-bit data output from the code separator 33 is an escape code, the coded data a[21:16] is an escape run and the coded data a[15:0] is an escape level. The code separator 33 supplies the coded data a[27:11] to the code table 35, the coded data a[21:16] to the input end $I_1$ of the first multiplexer 37, and the coded data a[15:0] to the level determiner 34, respectively. When an accumulated code length value is applied from the code length accumulator 36, the code separator 33 divides the 28-bit data having the earliest priority among the stored data in response thereto as described above, and outputs the divided data. Also, the code separator 33 generates a read signal to be supplied to the buffer 28 when the accumulated code length value reaches 28 bits. Since the above-described buffer 28 and the code separator 33 are well known to an ordinary artisan in connection with a variable length decoder using a barrel shifter, the detailed description thereof will be omitted.

Figure 4:
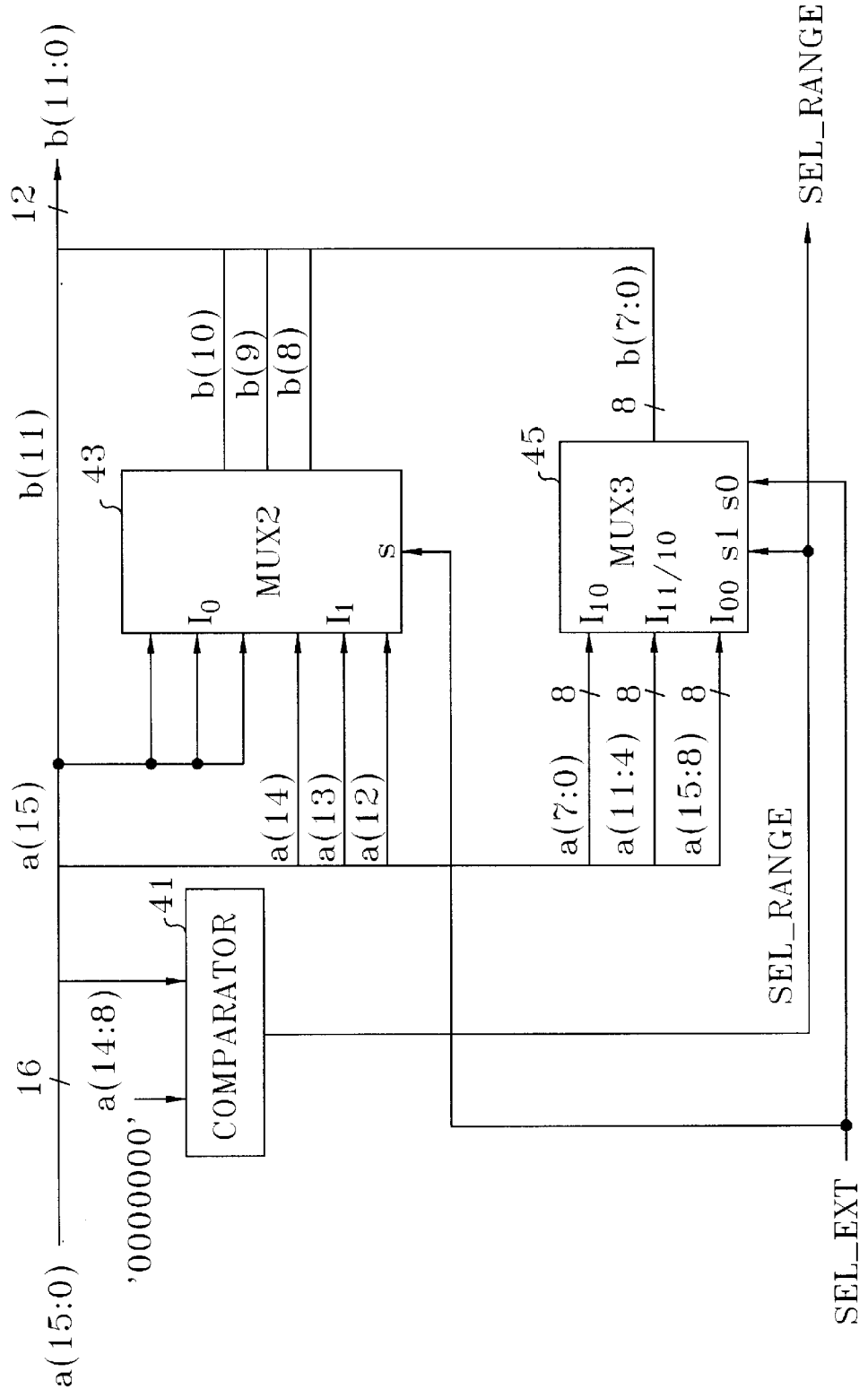
FIG. 4 is a detailed circuit diagram of the level determiner shown in FIG. 3.

FIG. 4 is a detailed circuit diagram of the level determiner 34 which receives the coded data a[15:0] from the code separator 33. A comparator 41 of FIG. 4 compares the absolute value of the escape level of the MPEG-1 standard contained in the input data with "128." That is, the comparator 41 compares the upper 7-bit data a[14:8] except for a sign bit among the coded data a[15:0] with a predetermined value "0000000." The escape level of the MPEG-1 is divided into two regions based on "128" as shown in FIG. 2A. When the absolute value of the escape level is equal to or larger than "128," the escape level is expressed as sixteen bits, while the absolute value thereof is smaller than "128," the escape level is expressed as eight bits. Accordingly, the comparator 41 outputs a range select signal SEL_RANGE having a value of "1" if the data a[14:8] is equal to a predetermined value "0000000," while the comparator 41 outputs a range select signal SEL_RANGE having a value of "0" if the data a[14:8] is not equal to "0000000." The range select signal SEL_RANGE is supplied to a select end S1 of a third multiplexer 45 and the code table 35. The second multiplexer 43 includes a first input end $I_0$ for receiving 3-bit sign bit data a[15] among the coded data a[15:0], a second input end $I_1$ for receiving the upper 3-bit data a[14:12] except the sign bit among the data a[15:0] and an output end for outputting 3-bit data. The second multiplexer 43 outputs the bit data of the first input end $I_0$ via the output end when a code standard signal SEL_EXT input to a selective end S thereof has a value of "0" representing a code standard of the MPEG-1 standard. The second multiplexer 43 outputs the bit data of the second input end $I_1$ via the output end when a code standard signal SEL_EXT input to a selective end S thereof has a value of "1" representing a code standard of the MPEG-2 standard. The third multiplexer 45 includes a first input end $I_{10}$ for receiving the lower 8-bit data a[7:0] among the coded data a[15:0], a second input end $I_{11/01}$ for receiving the upper 8-bit data a[11:4] except the uppermost 4-bit including the sign bit among the data a[15:0], a third input end $I_{00}$ for receiving the upper 8-bit data a[15:8] including a sign bit among the data a[15:0] and an output end for outputting 8-bit data. The third multiplexer 45 receives a code standard signal SEL_EXT via a selective end S0 and a range select signal SEL_RANGE via a selective end S1, respectively. The third multiplexer 45 selects the data input through the first, second or third input ends $I_{10}$, $I_{11/10}$ or $I_{00}$ according to the inputs of the selective ends S0 and S1. If a value of the code standard signal SEL_EXT is "0" and a value of the range select signal SEL_RANGE is "1," the third multiplexer 45 outputs the data a[7:0] of the first input end I$_{10}$ via the output end. If a value of the code standard signal SEL__EXT is "1," the third multiplexer 45 outputs the data a[11:4] of the second input end I$_{11/01}$ via the output end. If both a value of the code standard signal SEL__EXT and a value of the range select signal SEL__RANGE are "0" the third multiplexer 45 outputs the data a[15:8] of the third input end I$_{00}$ via the output end. In case that the absolute value of an escape level of the MPEG-1 standard is not less than "128," the lower eight bits are different from each other, and the remaining bits except the uppermost sign bit among the upper eight bits become "0000000" identically, as shown in the table of FIG. 2A. Thus, in this case, the lower eight bits are maintained in the level data output from the second and third multiplexers 43 and 45, and the upper bits are reduced within the limit of maintaining the sign bit, to be reconstructed into twelve bits. The data a[15] and the output data b[10:8] and b[7:0] of the second and third multiplexers 43 and 45 are supplied to the second input end I$_1$ of the first multiplexer 37.

Returning to the FIG. 3 apparatus, the code table 35 performs a detection operation of an escape ID code using the 17-bit data a[27:11] received from the code separator 33. If the escape ID code is not detected, a value of the signal SEL__ESC is "0" while if the escape ID code is detected, a value of the signal SEL__ESC is "1." The signal SEL__ESC is supplied to the selective end S of the first multiplexer 37. If the escape ID code is not detected, the code table 35 uses a variable length code table which is selected by the code standard signal SEL__EXT of the start code detector 31 and outputs additional information such as a quantization level and a motion vector in addition to a [run, level] code corresponding to the input data a[27:11]. Also, the code table 35 outputs a value of length of the decoded code representing the number of the bits of the input data used for determination of the [run, level] code to the code length accumulator 36. In case that the escape ID code is detected, the code table 35 outputs a value of length of the decoded code determined by the code standard signal SEL__EXT of the start code detector 31 and the range select signal SEL__RANGE of the level determiner 34, to the code length accumulator 36. For example, if the code standard signal SEL__EXT and the range select signal SEL__RANGE have an escape level of the MPEG-1 code standard whose value represents not less than "128," the length of the decoded code becomes "22." The code accumulator 36 accumulatively adds a length value of a newly applied decoded code from the code table 35 to a stored accumulated code length value and supplies the accumulated code length value to the code separator 33. The code length accumulator 36 supplies the state information to the code separator 33 whenever the accumulated code length value is not less than "28" and stores a value obtained by subtracting "28" from the accumulated code length value. The first multiplexer 37 supplies the [run, level] code received via the first input end I$_0$ from the code table 35 to the runlength decoder 38, if the value of the output signal SEL__ESC of the code table 35 is "0", while if the value of the signal SEL__ESC is "1," the first multiplexer 37 supplies the FLC code having the data b[11:0] received through the second input end I$_1$ to the runlength decoder 38. The runlength decoder 38 runlength-decodes the [run, level] code or the FLC code supplied from the first multiplexer 37. Since the runlength decoding is well known to a person skilled in the art, together with the variable length coding, the detailed description thereof will be omitted.

As described above, the present invention can decode the escape levels according to both MPEG-1 and MPEG-2 code standards by simply modifying the existing decoding apparatus.

What is claimed is:

1. An apparatus for decoding a variable length coded (VLC) and fixed length coded (FLC) data for use in MPEG-1 and MPEG-2 standards, said decoding apparatus comprising:

means for generating a code standard signal indicating whether input data is MPEG-1 code standard or MPEG-2 code standard; and means for determining a [run, level] code relating to a predetermined number of bits of the input data supplied from said means for generating a code standard signal according to said code standard signal, wherein said means for determining a [run, level] code outputs data from a fifth least significant bit (LSB) of the predetermined number of bits to a sixteenth least significant bit thereof as an escape code level, when the code standard signal indicates the MPEG-2 code standard, and determines the escape code level according to whether an absolute value of data within a specific bit interval contained in the predetermined number of bit data is larger than or equal to, or less than, 128, when the code standard signal indicates the MPEG-1 code standard; and wherein the MPEG-1 standard is ISO/IEC 11172 2 issued in 1993 and the MPEG-2 standard is ISO/IEC 13818 2 Draft International Standard issued Mar. 25, 1994.

2. The decoding apparatus for use in MPEG-1 and MPEG-2 standards according to claim 1, wherein said code standard signal generation means generates a code standard indicating the MPEG-2 code standard if an expansion start code is contained in the input data, while said code standard signal generation means generates a code standard signal indicating the MPEG-1 code standard if no expansion start code is contained in the input data.

3. The decoding apparatus for use in MPEG-1 and MPEG-2 standards according to claim 1, wherein said means for determining a [run, level] code comprises means for generating an indicating signal indicating whether or not data from a ninth least significant bit (LSB) in the predetermined number of bits supplied from said code standard signal generation to a fifteenth least significant bit are all zero; and means responsive to said indicating signal and the code standard signal for determining the escape code level corresponding to one of the MPEG-1 code standard and the MPEG-2 code standard.

4. The decoding apparatus for use in MPEG-1 and MPEG-2 standards according to claim 3, wherein said escape code level determination means comprises means for selecting a sixteenth least significant bit (LSD) of the predetermined number of bits to be supplied as sign bit data of the escape code level, when the code standard signal indicates the MPEG-1 code standard, for selecting data from the least significant bit (LSB) to an eighth least significant bit of the predetermined number of bits, as a lower 8-bits of the escape code level, when said indicating signal indicates that all data from a ninth least significant bit (LSB) to a fifteenth least significant bit in the predetermined number of bits supplied from said code standard signal generation are zero, and selecting data from the ninth least significant bit (LSB) to the sixteenth least significant bit, as a lower 8-bits of the escape code level, when said indicating signal indicates that all data from the ninth least significant bit (LSB) to the fifteenth least significant bit in the predetermined number of bits supplied from said code standard signal generation are not all zero.

* * * * *